Figure 1:
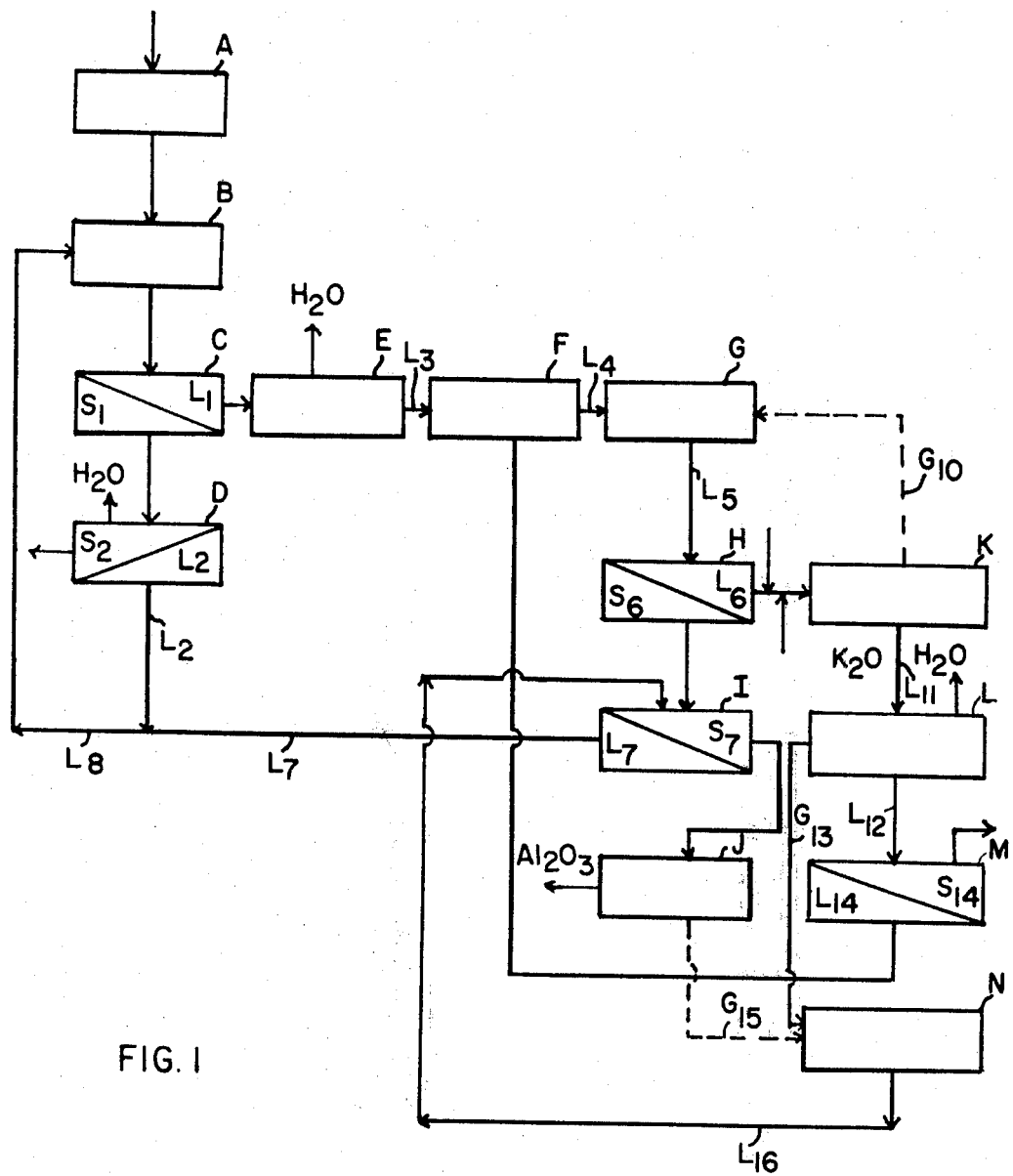

United States Patent [19]

Cohen et al.

[11] 4,241,030
[45] Dec. 23, 1980

[54] CONTINUOUS PROCESS FOR OBTAINING PURE ALUMINA FROM AN ACIDIC LIQUOR ORIGINATING FROM THE CHLOROSULPHURIC ATTACK OF AN ALUMINOUS ORE AND FOR THE PURIFICATION OF THE LIQUOR WHICH HAS BEEN FREED FROM ALUMINA

[75] Inventors: Joseph Cohen; Alain Adjemian; Michel Ferran, all of Aix-en-Provence, France

[73] Assignee: Aluminum Pechiney, Lyons, France

[21] Appl. No.: 35,439

[22] Filed: May 8, 1979

[30] Foreign Application Priority Data

May 18, 1978 [FR] France ................ 78 15370

[51] Int. Cl.³ .......................... C01F 7/22; C01F 7/26
[52] U.S. Cl. ................... 423/126; 423/128; 423/132
[58] Field of Search ............. 423/111, 126, 128, 132

[56] References Cited

U.S. PATENT DOCUMENTS

| 3,484,196 | 12/1969 | Cohen et al. | 423/128 |
|---|---|---|---|
| 3,620,671 | 11/1971 | Maurel et al. | 423/128 |
| 3,862,293 | 1/1975 | Maurel et al. | 423/128 |
| 4,124,680 | 11/1978 | Cohen et al. | 423/132 |

FOREIGN PATENT DOCUMENTS

| 574983 | 7/1924 | France | 423/132 |
|---|---|---|---|
| 1554586 | 1/1969 | France | 423/126 |
| 44-24883 | 10/1969 | Japan | 423/132 |

Primary Examiner—Herbert T. Carter
Attorney, Agent, or Firm—McDougall, Hersh & Scott

[57] ABSTRACT

A process for obtaining pure alumina comprising the combination of chlorosulphuric attack of calcined aluminous ores containing impurities, followed by concentration of the liquor obtained after the attack and separation of the sterile material, sulphuric acid treatment of the concentrated liquor followed by chlorination to precipitate almost all the hexahydrated aluminum chloride, separation of the precipitate of hexahydrated aluminum chloride and of the chlorosulphuric mother liquor charged with impurities, pyrohydrolysis of the precipitate to give the desired pure alumina with recycling of released hydrochloric acid, degassing of the chlorosulphuric liquor of impurities with recycling of the gaseous HCl for chlorination, yielding a sulphuric liquor of impurities, finally the elimination of the impurities present in this latter liquor in the form of a sulphuric precipitation by concentration in the presence of potassium ions.

7 Claims, 1 Drawing Figure

CONTINUOUS PROCESS FOR OBTAINING PURE ALUMINA FROM AN ACIDIC LIQUOR ORIGINATING FROM THE CHLOROSULPHURIC ATTACK OF AN ALUMINOUS ORE AND FOR THE PURIFICATION OF THE LIQUOR WHICH HAS BEEN FREED FROM ALUMINA

The invention relates to a new process for obtaining pure alumina involving a novel combination of chlorosulphuric attack of aluminous ores containing impurities followed by concentration of the liquor obtained after attack and separation of the sterile materials, sulphuric treatment of the concentrated liquor, then its chlorination to bring about the precipitation of almost all the hexahydrated aluminum chloride, separation of the hexahydrated aluminum chloride precipitate and the chlorosulphuric mother liquor which is charged with impurities, pyrohydrolysis of the precipitate to give the desired pure alumina with recycling of the released hydrochloric acid, degassing of the chlorosulphuric liquor of impurities with recyling of the gaseous HCl to the chlorination treatment yielding a sulphuric liquor of impurities, and finally the elimination of the impurities present in the latter liquor in the form of a sulphuric precipitation by concentration.

The hydrochloric acid attack of aluminous ores in order to extract alumina has been proposed for a long time. Although these processes have the common feature of the hydrochloric attack, they differ greatly in the means used to eliminate the impurities originating from the ore.

British Pat. No. 982,098 describes the attack of a calcined clay ore with a 20% hydrochloric acid solution, then, after separation of the sterile fraction constituted by silica, the extraction of the impurities present in the separated liquor by ion exchange, either on a solid resin or by an organic solvent. The hexahydrated aluminum chloride was thereafter precipitated by evaporating the purified liquor. Although this process is of interest, it, nevertheless, has the disadvantage of necessitating regeneration of the resin, demanding large volumes of liquors which then have to be treated before being discarded and thus consume a large quantity of energy.

Another more recent publication, British Pat. No. 1,104,088 also describes the hydrochloric attack of aluminous ores, the crystallization of hexahydrated aluminum chloride, by carrying out this crystallization treatment in several stages, the first stage giving, for example, pure hexahydrated aluminum chloride, while the other stages provide impure hydrated aluminum chloride. The impurities present in the original ore, which were found in solution in the liquor after the attack, were eliminated in a fraction of the mother liquor originating from the last crystallization of the hexahydrated aluminum chloride by evaporation and crystallization.

Although a process of this type may be of great interest to the skilled in the art, it has disadvantages in usage, two of which are very significant:

(a) the fraction of the mother liquor originating from the last crystallization of the aluminum chloride represented a large volume and, consequently, a large quantity of energy is required to induce the crystallization of the impurities by evaporation of the water;

(b) in addition to this fact, this liquor which was taken after the last crystallization, was rich in alumina with a yield higher than 13%, leading to unacceptable losses of this material.

Finally, a much more recent process has been proposed and described in French Pat. No. 1,541,467.

After a hydrochloric attack of the aluminous ore, then crystallization in at least two stages of the hexahydrated aluminum chloride by evaporation of water, the calcium which is present in solution in the mother liquor, obtained after the first crystallization of the hexahydrated aluminum chloride, was precipitated in the form of calcium sulphate, separated from the said liquor by the addition of a stoichiometric quantity of sulphuric acid, while the iron was extracted by means of a selective organic solvent, or a sequestering agent. The process also exhibited disadvantages such as loss of solvent with the aqueous liquors as well as the need to purge the impurities not eliminated by the solvent, involving a loss of hydrated aluminum chloride.

Although these cyclic processes afford numerous advantages, their application could not be sufficiently general in the present economic situation, owing to the large amounts of energy which they consumed and the rejection of effluents into the natural channels, which is being increasingly forbidden.

In pursuing their research in this field, the applicants have attempted to develop a process for the chlorosulphuric attack of aluminous ores, which they have combined with effective purification of the mother liquor obtained after the precipitation and the separation of the hexahydrated aluminuim chloride, all the liquor obtained being purified.

The process for obtaining a pure alumina, in accordance with the practice of this invention, from a calcined aluminous ore containing impurities, involves the hot acid attach of the said ore, separation of the residue of the attack and the mother liquor after attack, washing of the residue of the attack, concentration of the mother liquor after the attack, precipitation of $AlCl_3, 6H_2O$ by chlorination of the concentrated mother liquor, calcination of the hydrated aluminum chloride and the recycling of the effluents, and is characterized in that the ore is attacked by means of a recycled chlorosulphuric liquor containing a large proportion of HCl and a small proportion of $H_2SO_4$, in that the mother liquor originating from the attack is concentrated to the limit of solubility of the hexahydrated aluminum chloride, in that the concentrated chlorosulphuric mother liquor is mixed with a recycled sulphuric liquor, then subjected to chlorination by the introduction of recycled gaseous HCl in order to precipitate almost all the $AlCl_3, 6H_2O$, in that, after separation of the precipitate, the chlorosulphuric liquor containing the impurities is degassed in order to recycle HCl gas for the precipitation of $AlCl_3, 6H_2O$ and to recover a sulphuric liquor of impurities, in that some optionally recycled potassium is introduced into the sulphuric liquor of impurities in order to precipitate, by concentration of the said liquor, the ferripotassium sulphate and the other sulphates of impurities corresponding to the quantity of impurities originating from the ore and recycling the sulphuric liquor which is freed from impurities to the chlorosulphuric mother liquor originating from the attack.

In its essential features, the process according to the invention comprises the following stages:

(a) the attack of an aluminous ore which also contains other constituents such as iron, titanium, calcium, etc., by a recycled chlorosulphuric aqueous solution containing a large proportion of HCl and a small proportion of $H_2SO_4$, and between 1% and 3% of aluminum chlorides and various metals forming the impurities still present in the said liquor, which permits a solution to be obtained after the attack which is rich in dissolved aluminum chloride in a concentration which can attain 8 to 9% by weight $Al_2O_3$;

(b) separation into an impregnated residue of the attack and a chlorosulphuric liquor;

(c) treatment of this residue of the attack in order to extract the impregnation liquor by the use of a sufficient quantity of washing water to obtain inert materials which are eliminated and an aqueous solution which is recycled to the attack;

(d) concentration of the chlorosulphuric liquor containing alumina and the soluble impurities to the limit of solubility of the hexahydrated aluminum chloride in the medium;

(e) sulphuric renewal of the chlorosulphuric liquor leaving the evaporation treatment;

(f) chlorination of the chlorosulphuric liquor with hydrochloric gas until the hexahydrated aluminum chloride precipitates corresponding to the formula $AlCl_3, 6H_2O$;

(g) separation of this crystallized fraction of hydrated aluminum chloride impregnated with mother liquors and of a chlorosulphuric liquor containing almost all the impurities in solution;

(h) washing of the crystals of hydrated aluminum chloride by a hydrochloric liquor;

(i) recycling of the chlorosulphuric liquor originating from the washing of the hydrated aluminum chloride to the attack of the ore;

(j) thermal decomposition of the hydrated aluminum chloride to give pure alumina and the absorption of the hydrochloric gaseous effluents and the water vapors to constitute the above-mentioned washing liquor;

(k) degassing of the chlorosulphuric liquor of impurities with recycling of gaseous HCl to the above-mentioned chlorination;

(l) introduction of potassium in saline form;

(m) concentration of the sulphuric mother liquor with elimination of the last traces of gaseous HCl until the precipitation of sulphates of impurities corresponding to the quantities of impurities originating from the attack of the ore and from the potassium introduced; and (n) finally, the separation of the crystals of sulphates of impurities and of the sulphuric liquor which is recycled into the chlorosulphuric attacking liquor containing alumina and the impurities, before they are chlorinated.

The solution for the attack of the aluminous ores is formed of recycled aqueous solutions containing hydrochloric acid and sulphuric acid, the contents of which can be adjusted by an addition of fresh HCl and $H_2SO_4$ at any point of the cycle to compensate for losses, as well as an addition of water which can be constituted by the water for washing the inert materials, in order to obtain an attacking liquor containing, for example, approximately 20% of HCl and approximately 5% of $H_2SO_4$. The presence of $H_2SO_4$, even in a small quantity, improves very substantially the kinetics of the attack without causing HCl to be liberated.

The aluminous ore is attacked hot at a temperature close to boiling point, generally at atmospheric pressure and for a period which can vary from ½ hour to 5 hours.

After the chlorosulphuric attack of the ore, the product of the attack containing a solid phase formed by inert materials and a liquid phase in which the aluminum chlorides and the soluble impurities are dissolved, is separated.

The residue of the attack, forming the solid phase, is then washed with a suitable quantity of water, the liquor being recycled to the attack of the ore once the inert materials have been rinsed.

The liquor resulting from the chlorosulphuric attack of the aluminous ore is concentrated by evaporation to the limits of solubility of the hexahydrated aluminum chloride in the medium.

Then, the chlorosulphuric liquor originating from the evaporation is subjected to a sulphuric acid renewal by the introduction of a recycled sulphuric liquor containing from 40% to 65% of free $H_2SO_4$, this introduction allows the subsequent chlorination to be made easier in order to precipitate the hydrated aluminum chloride. If this recycled sulphuric liquor were not introduced, a large quantity of gaseous HCl would be needed.

Consequently, the chlorosulphuric liquor is chlorinated by introducing recycled gaseous HCl until precipitation, in the form of hexahydrated aluminum chloride, of almost all the alumina present in the chlorosulphuric liquor. The precipitate is separated from its chlorosulphuric mother liquor containing the impurities.

The crystals of hydrated aluminum chloride thus obtained are washed with a recycled hydrochloric liquor in order to eliminate the chlorosulphuric impregnation liquor as well as the impurities present in solution.

The washing of the hexahydrated aluminum chloride causes the hydrochloric liquor to entrain the impurities impregnating the precipitate, while dissolving a small fraction of alumina of the order of 2% to 5%. After washing, this liquor is recycled to the head of the process and constitutes the liquor for attacking the aluminous ore.

The crystals of hexahydrated aluminum chloride are then calcined by processes well known to the art to give the desired pure alumina and a gaseous phase constituted of HCl and water vapor which, once absorbed, constitutes the liquor which is rich in HCl and is intended for the washing of the said crystals.

The chlorosulphuric liquor separated from the hexahydrated aluminum chloride crystals contains essentially impurities constituted by iron, titanium, sodium, potassium, magnesium, calcium, as well as a very small fraction of alumina. If necessary, a complement of hydrocholoric acid and of sulphuric acid is added to it to compensate for the losses produced in the entire cycle.

The chlorosulphuric liquor is then degassed by heating, allowing the collection of the gaseous hydrochloric acid intended for chlorination and precipitation of the hexahydrated aluminum chloride. After this degassing operation, potassium is added to the said liquor in the form of recycled alum or potassium sulphate.

The sulphuric liquor is then concentrated by evaporation to cause precipitation of the impurities originating from the attack of the ore in the form of sulphates and of the potassium sulphate originating from the alum. The precipitated salts are essentially constituted by ferripotassium, titanopotassium sulphates, calcium sulphates, etc.

After separation, the sulphuric liquor, which is freed from almost all the impurities, is recycled while the solid residue can be treated in various ways to collect, for example, the potassium and/or constituents, and is optionally calcined to make use of the $SO_2$ by converting it into $H_2SO_4$ and reintroducing it into the circuit.

The process according to the invention is a cyclic process which permits the isolation of a pure alumina and a mixture of salts of impurities which are present in the form of single and/or double sulphates.

The consumption of reagent is low and concerns mainly the replacement of the losses of hydrochloric acid and sulphuric acid.

The process according to the invention can be applied to the treatment of natural or artificial aluminous materials containing impurities: these materials include silico-aluminous ores such as kaolins, siliceous bauxites, kaolin clays, shales containing or not containing coal or again impure aluminas originating from other processes.

The invention will be described with reference to the accompanying flow diagram.

According to the flow diagram, the raw aluminous ore is placed in (A) where it is calcined. This calcined ore and the recycled chlorosulphuric attacking liquor $L_8$ are then introduced into the attacking reactor (B). The pulp obtained after the attack is passed from (B) into (C) for the separation of a residue of the attack $S_1$ and a chlorosulphuric liquor $L_1$ containing the alumina and the dissolved impurities. The mother liquors for impregnating the cake $S_1$ are then extracted at (D) using a sufficient quantity of water and the liquor $L_2$, resulting from it, is mixed with the liquor $L_7$, the liquor used for washing the crystals of hydrated aluminum chloride before it is introduced into the attack.

The cake $S_2$ is then isolated. It is formed essentially of silica.

The liquor $L_1$ which is obtained after the attack of the ore and the separation of the gangue materials is then introduced into (E) for concentration by evaporation to the limit of solubility of the aluminum chloride in the medium.

The liquor $L_3$ originating from (E) is passed into (F) where this liquor is subjected to a sulphuric addition with the liquor $L_{14}$.

Upon leaving (F), the chlorosulphuric liquor $L_4$ is introduced into (G) where it is saturated with HCl by introducing the gaseous fraction $G_{10}$ of recycled HCl. This causes the precipitation of the alumina present by forming hexahydrated aluminum chloride.

The fraction $L_5$ originating from (G) is, in fact, a pulp constituted by a solid phase and a liquid phase which are separated in (H) into a solid fraction $S_6$ of hexahydrated aluminum chloride and a liquor $L_6$ containing the majority of the impurities constituted of iron, titanium, sodium, potassium, magnesium, calcium, etc.

The crystals $S_6$ of hydrated aluminum chloride are then introduced into (I) where they are rinsed with a recycled hydrochloric liquor $L_{16}$. Pure crystals $S_7$ of $AlCl_3$, $6H_2O$ freed from the hydrochloric mother liquor $L_6$ are obtained while the latter, entrained by $L_{16}$, constitutes a new hydrochloric liquor L which is virtually free from impurities and which is subsequently added to the liquor $L_2$ originating from the washing of the inert materials, to form the attacking liquor $L_8$.

The pure crystals $S_7$ which are impregnated with the rinsing liquor are then calcined in (J) to supply a pure alumina and a gaseous mixture $G_{15}$ containing HCl gas and water vapor absorbed in (N).

As already stated, the chlorosulphuric liquor $L_6$, originating from the separation treatment (H), contains in solution the majority of the impurities initially present in the ore. This liquor $L_6$ is then introduced into (K) where it is degassed to give a sulphuric liquor $L_{11}$ containing impurities and gaseous HCl $G_{10}$ which is recycled in (I).

The liquor $L_{11}$, to which is added a sufficient quantity of potassium in the form of a double salt for example, is then transferred into (L) for concentration by evaporation of water and elimination of the last traces of HCl constituting the gaseous fraction $G_{13}$ which is sent to the absorption treatment (N).

The fraction $L_{12}$, leaving (L), is present in the form of a pulp containing a solid phase constituted of the complex sulphates precipitated during evaporation in (L) and a liquid phase which is a sulphuric liquor.

The two phases are then separated in (M) into a cake $S_{14}$, a mixture of complex sulphates of iron, titanium, etc., which can be utilized later on and a liquor $L_{14}$ which is sent back into (F) to perform the sulphuric renewal of the chlorosulphuric liquor originating from the attack of the aluminous ore. Example A calcined kaolin having the following composition in percent by weight has been treated by the process of the invention:
$Al_2O_3$: 42.08%
$Fe_2O_3$: 1.37%
$TiO_2$: 2.37%
$Na_2O$: 0.08%
$K_2O$: 0.15%
$MgO$: 0.23%
$P_2O_5$: 0.08%
$CaO$: 1.07%
$SiO_2$ and various: 52.35%

2619 kg of this ore, which were calcined in (A), were placed in (B) in 13607 kg of a chlorosulphuric liquor $L_8$ containing in percent by weight:
HCl total: 19.98%
$H_2SO_4$: 4.76%
$Al_2O_3$: 0.83%
$Fe_2O_3$: 0.07%
$CaO$: 0.04%
$K_2O$: 0.02%
$MgO$: 0.01%
$P_2O_5$: 0.08%
$H_2O$: 74.21%

The attacking medium was at a temperature of 105° to 110° C. which was maintained at this level for 2 hours.

The pulp obtained after the attack, which was still at a temperature higher than 105° C., was transferred into (C) where the solid phase $S_1$ and liquid phase $L_1$ containing the dissolved alumina and a large proportion of the impurities initially present in the ore were separated.

The cake $S_1$ was then rinsed in (D) with 5608 kg of water, permitting the extraction of the mother waters impregnating the inert materials to give an inert residue $S_2$ and a residual liquor $L_2$, representing a mass of 4711 kg, which was added to the liquor $L_7$ to constitute the attacking liquor $L_8$.

Since the residue $S_2$ represented a mass of 1626 kg in the dry state, it had the following composition expressed in percent by weight:
$Al_2O_3$: 4.74%
$Fe_2O_3$: 0.31%
$TiO_2$: 3.75%
$K_2O$: 0.06%
$CaO$: 0.12%
$H_2O$: 7.13%
$SiO_2$ and various: 83.89%

The liquor $L_1$, obtained after the attack of the ore and separation of the inert meterials, represented a mass of 13800 kg and had the following composition, expressed in percent by weight:
$Al_2O_3$: 7.79%

$Fe_2O_3$: 0.28%
$Na_2$: 0.01%
$K_2O$: 0.04%
$MgO$: 0.05%
$P_2O_5$: 0.01%
$CaO$: 0.21%
$HCl$: 18.62%
$So_4H_2$: 4.44%
$H_2O$: 68.55%

On leaving (C), this liquor $L_1$ was introduced into (E) where it was concentrated by evaporation, removing 4162 kg of water and giving 9638 kg of a liquor $L_3$ which had the following composition, expressed in percent by weight:
$Al_2O_3$: 11.16%
$Fe_2O_3$: 0.39%
$TiO_2$: 0.01%
$Na_2O$: 0.02%
$K_2O$: 0.06%
$MgO$: 0.07%
$P_2O_5$: 0.02%
$CaO$: 0.30%
$H_2SO_4$: 6.36%
$HCl$: 26.67%
$H_2O$: 54.94%

The liquor $L_3$ was then introduced into (F) where a sulphuric renewal took place by the introduction of 8000 kg of a liquor $L_{14}$ which had the following composition, expressed in percent by weight:
$Al_2O_3$: 0.30%
$Fe_2O_3$: 0.30%
$K_2O$: 0.30%
$H_2SO_4$ free: 60.00%
$H_2SO_4$ total: 61.70%
$H_2O$: 37.40%

Coming from (F), the chlorosulphuric liquor $L_4$ with a mass of 17638 kg was transferred into (G) where it was chlorinated by the introduction of 1650 kg of gaseous HCl originating from the degassing treatment (K).

The product $L_5$ of chlorination was transferred into (H) for the separation of the chlorosulphuric liquor $L_6$ representing a mass of 12655 kg and the crystals $S_6$ of hexahydrated aluminum chloride representing a mass of 6633 kg and having the following composition, expressed in percent by weight:
$Al_2O_3$: 16.10%
$Fe_2O_3$: 0.11%
$K_2O$: 0.05%
$MgO$: 0.02%
$CaO$: 0.05%
$H_2SO_4$ total: 9.30%
$HCl$: 37.71%
$H_2O$: 36.66%

The crystals $S_6$ were rinsed in (I) with 7763 kg of a liquor $L_{16}$ of recycled hydrochloric acid having a concentration of 32% to give 8896 kg of a hydrochloric liquor $L_7$ intended to be sent back to the attack of the ore.

After rinsing, the crystals $S_7$ of hexahydrated aluminum chloride were calcined in (J) to give 1000 kg of pure alumina and 4891 kg of HCl vapor and water $G_{15}$ which were washed and absorbed in (N) to constitute, with the gaseous fraction $G_{13}$, the liquor $L_{16}$ for rinsing the hexahydrated aluminum chloride.

As previously described, the liquor $L_6$ originating from the separation treatment (H) and containing in solution the dissolved impurities, represented a mass of 12655 kg.

This liquor had the following composition, expressed in percent by weight:
$Al_2O_3$: 0.25%
$Fe_2O_3$: 0.44%
$TiO_2$: 0.01%
$Na_2O$: 0.02%
$K_2O$: 0.21%
$MgO$: 0.05%
$P_2O_5$: 0.02%
$CaO$: 0.21%
$HCl$: 13.58%
$H_2SO_4$: 38.97%
$H_2O$: 46.24%

A mass of 109 kg of 35% HCl and a mass of 324 kg of 96% $H_2SO_4$ were added to this chlorosulphuric liquor in order to compensate for the losses during the cycle, thus forming a new liquor $L_9$ which had the following composition, expressed in percent by weight:
$Al_2O_3$: 0.24%
$Fe_2O_3$: 0.42%
$TiO_2$: 0.01%
$Na_2O$: 0.02%
$K_2O$: 0.21%
$MgO$: 0.05%
$P_2O_5$: 0.02%
$CaO$: 0.20%
$HCl$: 13.42%
$H_2SO_4$: 40.06%
$H_2O$: 43.35%

The liquor $L_9$ which represented a mass of 13088 kg was then introduced into (K) where degassing produced 1650 kg of gaseous HCl which was led toward (G) via $G_{10}$ and 11438 kg of an essentially sulphuric liquor still containing impurities, to which liquor was added a mass of 28 kg of $K_2SO_4$ thus forming the liquor $L_{11}$ of 11466 kg.

This liquor $L_{11}$ was transferred into (L) for concentration by evaporation of 52 kg of water and the elimination of the water vapor and the last traces of HCl which were directed toward the absorption treatment (N).

The fraction $L_{12}$ leaving (L) reresented a mass of 8542 kg constituted by a solid phase suspended in the liquid phase.

When introduced into (M), this fraction $L_{12}$ gave 542 kg of a cake $S_{14}$ and 8000 kg of a sulphuric liquor $L_{14}$.

The cake $S_{14}$ was formed of double sulphates with impurities to be eliminated which were precipitated during the evaporation operation in (L), and had the following composition, expressed in percent by weight:
$Al_2O_3$: 1.29%
$Fe_2O_3$: 5.72%
$TiO_2$: 0.18%
$Na_2O$: 0.37%
$K_2O$: 3.32%
$MgO$: 1.11%
$P_2O_5$: 0.37%
$CaO$: 4.80%
$H_2SO_4$ total: 30.07%
$H_2SO_4$ total: 59.59%
$H_2O$: 23.25%

The sulphuric liquor $S_{14}$ was recycled into (F) to be added to the liquor $L_3$.

The alumina obtained was extremely pure and analysis demonstrated that the few impurities present were present in quantities expressed in ppm which were smaller than those generally measured in the aluminas obtained by large industrial processes:

Fe<200 ppm
Si<20 ppm
Ti<10 ppm
K<100 ppm
Na<20 ppm

We claim:

1. A process for obtaining a purified alumina from calcined aluminous ore containing impurities of metals selected from the group consisting of iron, titanium, sodium, potassium, magnesium and calcium comprising:
    (a) attacking the ore with hot chlorosulphuric acid to provide a residue and a liquor containing dissolved alumina and impurities,
    (b) separating the residue from the liquor,
    (c) washing the separated residue with aqueous medium to extract the solubles,
    (d) recycling the wash liquor from step (c) to make up a part of the chlorosulphuric acid attacking liquor in step (a),
    (e) concentrating the liquor separated in step (b) to the limit of solubility of aluminum chloride hexahydrate,
    (f) adding sulphuric acid liquor to the concentrate of step (e),
    (g) introducing HCl gas recycled from step (j) into the mixture from step (f) to precipitate almost all of the aluminum chloride hexahydrate,
    (h) separating the liquor containing the impurities from the precipitate from step (g),
    (i) degassing the liquor separated in step (h) to release HCl gas,
    (j) recycling the gaseous HCl for introduction into the mixture in step (g) to precipitate almost all of the aluminum chloride hexahydrate,
    (k) adding potassium ions to the degassed liquor from step (i),
    (l) concentrating the liquor from step (k) to precipitate ferripotassium sulphates and sulphates of other impurities,
    (m) separating the sulphuric liquor from the precipitate formed in step (l),
    (n) recycling the sulphuric liquor from step (m) to the sulphating step (f), and
    (o) thermally decomposing the separated aluminum chloride hexahydrate from step (h) to produce pure alumina.

2. A process as claimed in claim 1, characterized in that the attacking liquor contains about 20% of HCl and 5% of $H_2SO_4$.

3. A process as claimed in claim 1, in which the attack is performed at a temperature close to the boiling point.

4. A process as claimed in claim 1, which includes the step of mixing the concentrated chlorosulphuric mother liquor originating from the attack, with a recycled sulphuric liquor containing from 40 to 65% of free $H_2SO_4$.

5. A process as claimed in claim 1, which includes the step of calcining the ferripotassium sulphates and sulphates of impurities, transforming the $SO_2$ obtained into $H_2SO_4$ for recycle into the treatment circuit.

6. The process as claimed in claim 1 which includes the step of:
    (p) washing the separated precipitate from step (h) with hydrochloric acid liquor recycled from step (s)
    (q) recycling the liquor separated from the precipitate of step (p) to form a part of the chlorosulphuric attack liquor in step (a),
    (r) calcining the precipitate from step (p) to yield purified aluminum oxide and HCl gas, and
    (s) absorbing the HCl gas from step (q) to form hydrochloric acid recycled to the wash step (p).

7. The process as claimed in claim 6 in which HCl gas is liberated during the concentration of the liquor in step (l) and which includes the step of absorbing the HCl gas to form a hydrochloric acid liquor recycled to wash the precipitate in step (p).

* * * * *

UNITED STATES PATENT OFFICE
CERTIFICATE OF CORRECTION

Patent No. 4,241,030　　　　　　　Dated December 23, 1980

Inventor(s)　Joseph Cohen, Alain Adjemian and Michel Ferran

It is certified that error appears in the above-identified patent and that said Letters Patent are hereby corrected as shown below:

Col. 2, line 33, change "attach" to -- attack --

Col. 5, line 54, change "L" to -- $L_7$ --

Signed and Sealed this

Ninth Day of June 1981

[SEAL]

Attest:

RENE D. TEGTMEYER

Attesting Officer　　Acting Commissioner of Patents and Trademarks